(12) United States Patent
Yamashita

(10) Patent No.: US 8,487,182 B2
(45) Date of Patent: Jul. 16, 2013

(54) WIRING HARNESS SUBUNIT, WIRING HARNESS UNIT AND METHOD FOR ASSEMBLING WIRING HARNESS UNIT

(75) Inventor: Takayuki Yamashita, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 278 days.

(21) Appl. No.: 12/662,957

(22) Filed: May 13, 2010

(65) Prior Publication Data
US 2010/0294563 A1 Nov. 25, 2010

(30) Foreign Application Priority Data
May 22, 2009 (JP) .................................. 2009-124256

(51) Int. Cl.
*H02G 3/04* (2006.01)
(52) U.S. Cl.
USPC ....................... 174/72 A; 174/70 R; 174/68.1
(58) Field of Classification Search
USPC ................ 174/72 A, 135, 69, 70 R, 71 R, 60, 174/68.1, 72 R; 439/34
See application file for complete search history.

(56) References Cited

U.S. PATENT DOCUMENTS

| | | | |
|---|---|---|---|
| 5,092,647 A | 3/1992 | Ueda et al. | |
| 5,556,059 A | 9/1996 | Maeda et al. | |
| 6,107,570 A * | 8/2000 | Suzuki et al. | 174/72 A |
| 6,217,375 B1 | 4/2001 | Nagai et al. | |
| 6,536,835 B2 * | 3/2003 | Murakami et al. | 296/152 |
| 6,603,076 B2 * | 8/2003 | Doshita et al. | 174/72 A |
| 6,919,511 B2 * | 7/2005 | Tsunoda et al. | 174/72 A |
| 7,202,415 B2 * | 4/2007 | Fujita | 174/72 A |
| 2002/0113460 A1 * | 8/2002 | Murakami et al. | 296/152 |

FOREIGN PATENT DOCUMENTS

| | | |
|---|---|---|
| EP | 1544046 A1 | 6/2005 |
| JP | 2000-335329 A | 12/2000 |

OTHER PUBLICATIONS

European Search Report issued Oct. 11, 2010, for European Patent Application No. 10161238.0.
Office Action for Euorpean Patent Application No. 10161238.0.

* cited by examiner

*Primary Examiner* — Angel R Estrada
*Assistant Examiner* — Dimary Lopez
(74) *Attorney, Agent, or Firm* — Edwards Wildman Palmer LLP; James E. Armstrong, IV; Stephen D. LeBarron

(57) ABSTRACT

A wiring harness subunit is routed on an interior panel to be attached to a ceiling wall inside a vehicle. The wiring harness subunit includes: a wiring harness having a tip end part extended through the outer edge of the interior panel, and a base end part continued to the tip end part and attached to the interior panel; a first attaching member for fixing an end of the base end part to the interior panel so as to allow the tip end part to be moved to absorb a slack; and a second attaching member for fixing the other end of the base end part to the interior panel. An extra length part having a predetermined length is interposed between the first attaching member and the second attaching member of the base end part.

10 Claims, 4 Drawing Sheets

WIRING HARNESS SUBUNIT, WIRING HARNESS UNIT AND METHOD FOR ASSEMBLING WIRING HARNESS UNIT

CROSS REFERENCE TO RELATED APPLICATIONS

This application is on the basis of Japanese Patent Application No. 2009-124256, the contents of which are hereby incorporated by reference.

BACKGROUND OF THE INVENTION

1. Field of the Invention

The present invention relates to a wiring harness subunit arranged on a plate-shaped base member mounted on a vehicle such as an interior panel attached to a ceiling inside the vehicle, to a wiring harness unit having the wiring harness subunit and the base member, and to a method for assembling the wiring harness unit. Particularly, the present invention relates to the wiring harness subunit, the wiring harness unit, and the method of assembling the wiring harness unit, each having a wiring harness extended through an outer edge of the base member, and connected to an outer electric component.

2. Description of the Related Art

Various electric components such as a car navigation system, an audio instrument, lamps, and the like are mounted on a vehicle. These electric components are supplied with power from a power source such as a battery and send/receive control signals to/from an electronic control unit via a wiring harness arranged inside a vehicle. The wiring harness is formed by bundling a plurality of electric wires.

Conventionally, the wiring harness is directly attached to a vehicle body and wired in a vehicle assembling process. Therefore, when attaching the wiring harness, after the wiring harness is arranged along a predetermined wiring position, the wiring harness is fixed at a plurality of positions with tapes or brackets. Therefore, workability is not good, and it requires a long time for fixing, thereby operating cost is increased. Further, in particular, when attaching the wiring harness onto the ceiling inside a vehicle, a worker is postured up, and the workability is further reduced.

Therefore, for example, a wiring harness unit composed of a wiring harness and a base member such as an interior panel to be attached to a ceiling of a vehicle is assembled in an another process. Then, by attaching the wiring harness unit to the ceiling, the wiring harness and the base member are simultaneously attached to the ceiling. Thus, workability in a vehicle assembling process is increased, and the operating cost is reduced.

For an example, as shown in FIG. 6, a wiring harness unit 601 includes: a top seal 610 as a base member; a wiring harness 620; and tapes 630, 640 as an attaching member. The top seal 610 is attached to a ceiling inside a vehicle. The wiring harness 620 includes: a branch line 621 having a tip end part 622 and a base end part 623; and a not-shown main line. A connector 626 to be connected to an outer electric component is provided at a tip end of the branch line 621. The tip end part 622 is extended through an outer edge 610b of the top seal 610. An end part 623a of the base end part 623 near the tip end part 622 is fixed to a top wall 610a of the top seal 610 with the tape 630. Further, the other end part 623b of the base end part 623 far from the tip end part 622 is fixed to the top wall 610a with the tape 640. Further, the not-shown main line is fixed to the top wall 610a with a not-shown tape. In the wiring harness unit 601, because the wiring harness 620 is fixed to the top seal 610, the top seal 610 and the wiring harness 620 are simultaneously attached to the ceiling. Therefore, the workability is increased, and the operation cost is reduced.

For another example, as shown in FIG. 7, a wiring harness unit 701 disclosed in Patent Document 1 includes: a roof lining 708 as the base member; a wiring harness 709; a plurality of harness holding members 710; and a plurality of resin members 711. The roof lining 708 is attached to a ceiling inside a vehicle. The wiring harness 709 includes: a branch line 709a; and a main line 709b. The branch line 709a is branched from the main line 709b. A connector 720 to be connected to an outer electric component is provided at a tip end of the branch line 709a. A tip end part of the branch line 709a is extended through an outer edge of the roof lining 708. The harness holding members 710 are provided at a bending position and at a branch position of the wiring harness 709. The wiring harness 709 is held by the harness holding members 710, and partially fixed to the roof lining 708 with the resin members 711. Like the wiring harness unit 601, using the wiring harness unit 701, the workability is increased, and the operation cost is reduced.

[Patent Document 1] JP, A, No. 2000-335329

A length of a wiring harness arranged in a vehicle may be changed due to heat or the like. Therefore, a predetermined tolerance is added to the length for producing the wiring harness. However, because the wiring harness of the wiring harness unit as described above is fixed to the base member with tapes or resin members, the position of the wiring harness cannot be moved. Therefore, when the branch line having the minimum tolerance is assembled, the branch line may run out of length and it may be difficult to connect the connector at the tip end of the branch line with the outer electric component. Further, when the branch line has the maximum tolerance, a surplus length may exist, the branch line may be curved in the middle, and it may be difficult to assemble a decoration cover for covering the branch line. Namely, there is a problem that the workability is reduced due to an influence of the tolerance. Further, in the wiring harness unit 701 as described above, when the resin members 711 are not provided, the position of the wiring harness 709 can be moved, and an extending length of the branch line 709a can be adjusted a little. However, in addition to the branch line 709a, the main line 709b may be also moved. Thus, there is another problem that in the other branch lines 709a, a disconnection or the like may occur.

Accordingly, an object of the present invention is to provide a wiring harness subunit, a wiring harness unit, and a method for assembling the wiring harness unit to allow an extended length from an outer edge of a base member to be adjusted.

SUMMARY OF THE INVENTION

In order to attain the object, according to the present invention, there is provided a wiring harness subunit arranged on a plate-shaped base member to be attached to a vehicle body including:

a wiring harness having a tip end part extended through an outer edge of the base member, and a base end part continued to the tip end part and attached to the base member;

a first attaching member configured to hold one end of the base end part near the tip end part on the base member to allow the tip end part to be moved to absorb a slack; and a second attaching member configured to fix the other end opposed to the one end of the base end part to the base member, wherein an extra length part having a predetermined length is provided between the first and second attaching members of the base end part.

Preferably, the first attaching member includes a corrugate tube fixed to the base member, and into which an end of the base end part is inserted.

Preferably, an inner diameter of the corrugate tube is substantially the same as an outer diameter of the one end of the base end part.

Preferably, an end of the base end part and a part of or a whole of the tip end part are inserted into an interior of the corrugate tube, and the one end near the tip end part is extended through the outer edge of the base member.

Preferably, the extra length part has a banding part formed by folding and banding a part of the extra length part, and the first and second attaching members are so arranged on the base member that an axis of the one end of the base end part and an axis of the other end of the base end part are not in the same direction.

According to another aspect of the present invention, there is provided a wiring harness unit including:

a plate-shaped base member to be attached to a vehicle body; and a wiring harness subunit as claimed in any one of claims 1 to 5 arranged on the base member.

According to another aspect of the present invention, there is provided a method for producing a wiring harness unit, said wiring harness unit including: a plate-shaped base member configured to be attached to a vehicle body; and a wiring harness subunit, said wiring harness subunit including:

a wiring harness having a tip end part extended through an outer edge of the base member, and a base end part continued from the tip end part and attached to the base member;

a first attaching member configured to hold one end of the base end part near the tip end part on the base member to allow the tip end part to be moved to absorb a slack; and a second attaching member configured to fix the other end opposed to the one end of the base end part to the base member, wherein an extra length part having a predetermined length is provided between the first and second attaching members of the base end part, said method including sequentially the steps of:

moving outward the tip end part from the outer edge of the base member to extract the extra length part as the tip end part;

connecting the tip end part to an outer electric component;

attaching the base member to a ceiling wall of a vehicle; and moving the tip end part toward the outer edge of the base member to adjust a length of the tip end part.

These and other objects, features, and advantages of the present invention will become more apparent upon reading of the following detailed description along with the accompanied drawings.

DETAILED DESCRIPTION OF THE PREFERRED EMBODIMENTS

Figure 1:
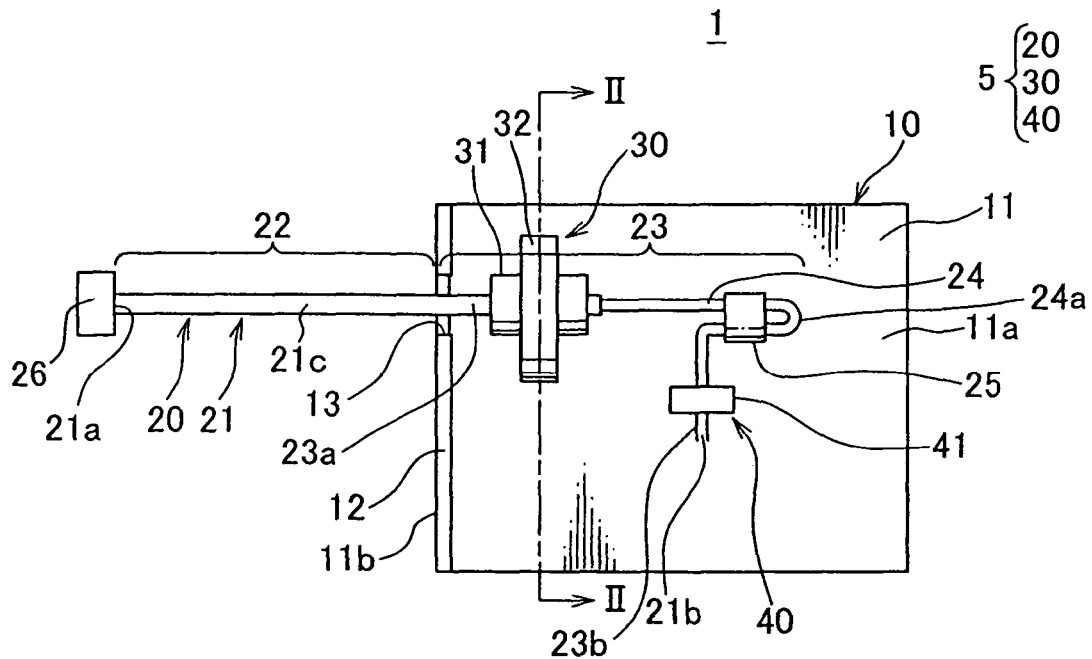
FIG. 1 is a partial top view showing an embodiment of a wiring harness unit according to the present invention.
Figure 2:
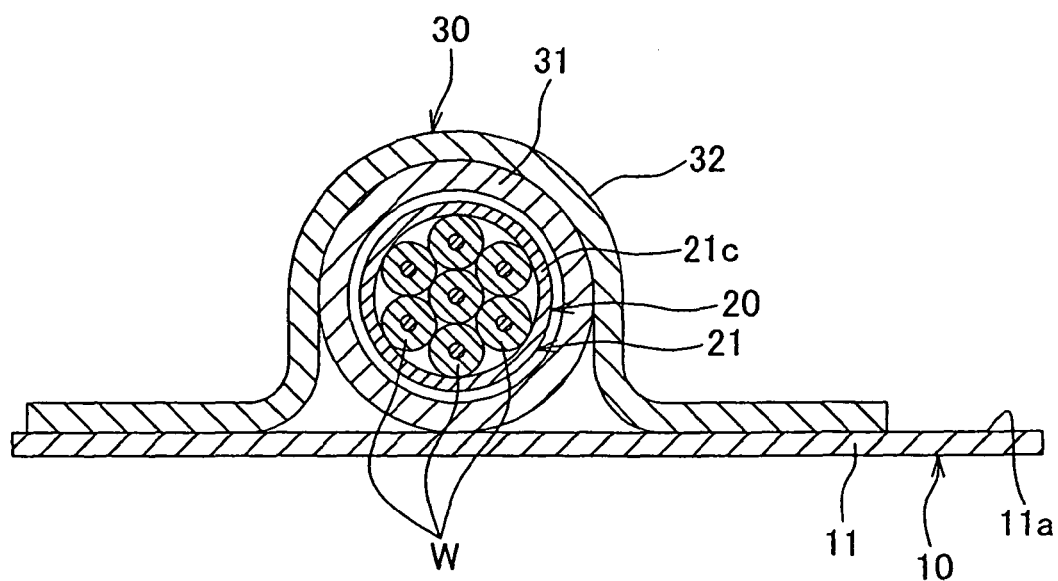
FIG. 2 is a sectional view taken on line II-II of FIG. 1.

Hereinafter, an embodiment of a wiring harness subunit and a wiring harness unit according to the present invention will be explained with reference to FIGS. 1 to 4.

When the wiring harness unit 1 is arranged on a ceiling wall inside a vehicle and covers the ceiling wall, the wiring harness unit 1 decorates an interior of the vehicle, and arranges a wiring harness for supplying electric power to electric components disposed near the ceiling.

As shown in figures, the wiring harness unit 1 includes: an interior panel 10 as a base member; and a wiring harness subunit 5.

The interior panel 10 is attached to the ceiling wall. The interior panel 10 includes: a main body 11 and a wall part 12.

The main body 11 is formed in a substantially rectangular plate shape along a shape of the ceiling wall. A not-shown design layer composed of, for example, a knit or a nonwoven fabric made of synthetic fiber or natural fiber, or a synthetic resin having a simulated leather surface is provided at a lower wall facing an inside of a vehicle body of the main body 11. This design layer decorates the interior of a vehicle and improves the beauty of the interior of the vehicle. Further, a wiring harness subunit 5 is attached to an upper wall 11a facing the ceiling wall of a vehicle.

The wall part 12 is projected on an outer edge 16b of the main body 11 positioned at a front side of a vehicle (namely, the outer edge 11b of the interior panel 10) toward the upper wall 11a. A notch 13 is formed on the wall part 12 at a position through which a later-described edge part for an external connection 21 of a wiring harness 20 is extended. The notch 13 is formed by cutting out an upper edge of the wall part 12 in a semicircular shape in a plan view. The edge part for an external connection 21 is inserted into the notch 13. In this embodiment, the notch 13 is formed on the wall part 12. However, instead of this, a hole or the like may be formed on the wall part 12 in a circular shape in a plan view, or a rectangular shape in a plan view. Any shape of the hole, the notch, or the like can be used as long as the edge part for an external connection 21 can be inserted. Incidentally, in this embodiment, the base member includes the interior panel 10. However, the present invention is not limited to this. A plate-shaped member interposed between the interior panel and the ceiling wall and having no design layer, only aimed for attaching the wiring harness onto the ceiling wall may be used as the base member.

The wiring harness subunit 5 includes the wiring harness 20, a first attaching member 30, and a second attaching member 40.

The wiring harness 20 is formed by bundling a plurality of covered electric wires W. The wiring harness 20 includes: a not-shown main line and the edge part for an external connection 21 continued to the main line or branched from the main line. The wiring harness 20 may have no branch line in which the main line and the edge part for an external connection are continued as a single line, or may have one or a plurality of branches branched from the main line.

A connector 26 for connecting to a not-shown electric component unit provided on an upper part of a windshield inside a vehicle is formed on a tip end 21a of the edge part for an external connection 21. An electrically-driven rearview mirror, a map lamp, a vanity lamp or the like are provided in this electric component unit. A base end 21b of the edge part for an external connection 21 is connected to a not shown main line of the wiring harness 20. A length of the edge part for an external connection 21 is a maximum tolerance and a predetermined extra length. This extra length is appropriately determined according to a structure of the wiring harness unit 1. The edge part for an external connection 21 includes: a tip end part 22 and a base end part 23.

The tip end part 22 is extended through the notch 13 formed on the wall part 12 of the interior panel 10 (namely, from the outer edge 11b of the interior panel 10). The base end part 23 is continued to the tip end part 22 and arranged on the upper wall 11a of the main body 11 of the interior panel 10. Further, an extra length part 24 composed of a predetermined extra length is formed on the base end part 23. A binding part 24a is provided at the extra length part 24. A part of the binding part 24a is folded in a U-shape, and two parts of the binding part 24a close to each other are fixed with a tape 25. Thus, because the binding part 24a is provided at the extra length part 24, the extra length part 24 becomes compact. In this embodiment, the binding part 24a is provided at the extra length part 24. However, this invention is not limited to this. For example, a gentle curve portion may be provided at the extra length part 24. Further, the binding part 24a of the extra length part 24 may be folded a plurality of times. A cover member 21c made of such as polyvinyl chloride (PVC) covers the tip end part 22 and a one end 23a of the base end part 23 near the tip end part 22. The edge part for an external connection 21 has the substantially same outer diameter throughout the portions covered by the cover member 21c.

The first attaching member 30 is a member for attaching the one end 23a of the base end part 23 near the tip end part 22 to the upper wall 11a of the main body 11 of the interior panel 10. The first attaching member 30 includes: a corrugate tube 31 and a tape 32.

The corrugate tube 31 is a well-known wire protector made of such as synthetic resin, having a circular or oval sectional tubular shape, and formed shorter than the base end part 23. The one end 23a of the base end part 23 is inserted into an interior of the corrugate tube 31. Namely, the one end 23a of the base end part 23 is disposed on the interior of the corrugate tube 31. The corrugate tube 31 is disposed near the notch 13 of the main body 11 in a manner that an axis of the corrugate tube 31 is perpendicular to the wall part 12, and fixed with the tape 32 in a manner that an end of the corrugate tube 31 faces the notch 13. The corrugate tube 31 holds the one end 23a of the base end part 23 on the upper wall 11a of the main body 11 so as to allow the tip end part 22 to be moved in a slack absorbing direction (namely, a direction for extracting the tip end part 22 from the outer edge 11b of the interior panel 10, and a direction for pushing the tip end part 22 toward the outer edge 11b of the interior panel 10).

Preferably, an inner diameter (a shorter diameter in a case of the oval shape section) of the corrugate tube 31 is the substantially same as an outer diameter of the one end 23a of the base end part 23 (namely, an outer diameter of the edge part for an external connection 21 covered by the cover member 21c). Thus, an inner peripheral wall of the corrugate tube 31 contacts an outer peripheral wall of the one end 23a of the base end part 23. Therefore, the base end part 23 is sandwiched and firmly held by a whole inner periphery of the corrugate tube 31 (a part of the inner periphery facing along the shorter diameter in a case of the oval shape section). When a force for absorbing a slack is applied to the tip end part 22, the inner peripheral wall of the corrugate tube 31 and the outer peripheral wall of the one end 23a of the base end part 23 slide together to adjust the length of the tip end part 22. Therefore, the length of the tip end part 22 can be adjusted as necessary, and for example, after assembling, an unintentional move (expansion or contraction) of the tip end part 22 due to such as a vibration of a vehicle is prevented.

The second attaching member 40 is a member for fixing the other end 23b of the base end part 23 opposed to the end 23 to the upper wall 11a of the main body 11 of the interior panel 10. The second attaching member 40 and the first attaching member 30 are disposed with a gap therebetween. The second attaching member 40 includes a tape 41. The tape 41 fixes the other end 23b of the base end part 23 to the upper wall 11a of the main body 11. Thereby, a portion of the wiring harness 20 positioned at the main line side from the tape 41 (namely, portions other than the tip end part 22 and the base end part 23) does not move in response to the movement of the tip end part 22.

Further, in this embodiment, the first attaching member 30 and the second attaching member 40 are so arranged that an axis of the one end 23a of the base end part 23 and an axis of the other end 23b of the base end part 23 are perpendicular to each other. For example, if the axis of the one end 23a and the axis of the other end 23b are coaxial or parallel to each other, when the tip end part 22 is pushed and the length of the extra length part 24 is increased, a curving direction of the extra length part 24 may be not specified, thereby a large space is needed for receiving the extra length part 24. However, according to this embodiment, because the axis of the one end 23a and the axis of the other end 23b are arranged in different directions, the extra length part 24 can be bent in a predetermined curving direction (namely, an intersection of a line extended from the axis of the one end 23a and a line extended from the axis of the other end 23b), thereby the space for receiving the extra length part 24 can be reduced and designed easily. As just described, preferably, the first attaching member 30 and the second attaching member 40 are so arranged in the interior panel 10 that the axis of the one end 23a of the base end part 23 and the axis of the other end 23b of the base end part 23 are arranged in different directions.

The extra length part 24 is positioned between the first attaching member 30 and the second attaching member 40 (namely, between the one end 23a and the other end 23b) and a slack is provided. Thereby, when the tip end part 22 is moved outward from the outer edge 11b of the interior panel 10, the extra length part 24 is extracted as the tip end part 22. Further, when the tip end part 22 is pushed toward the outer edge 11b of the interior panel 10, the length of the pushed tip end part 22 is positioned between the first attaching member 30 and the second attaching member 40 as the extra length part 24. Therefore, the length (slack) of the extra length part 24 is adjusted between the first attaching member 30 and the second attaching member 40 to expand and contract the length of the tip end part 22.

Next, an example of operations of the wiring harness sub-unit 5 and the wiring harness unit 1 according to the present invention will be explained with reference to figures.

Figure 3:
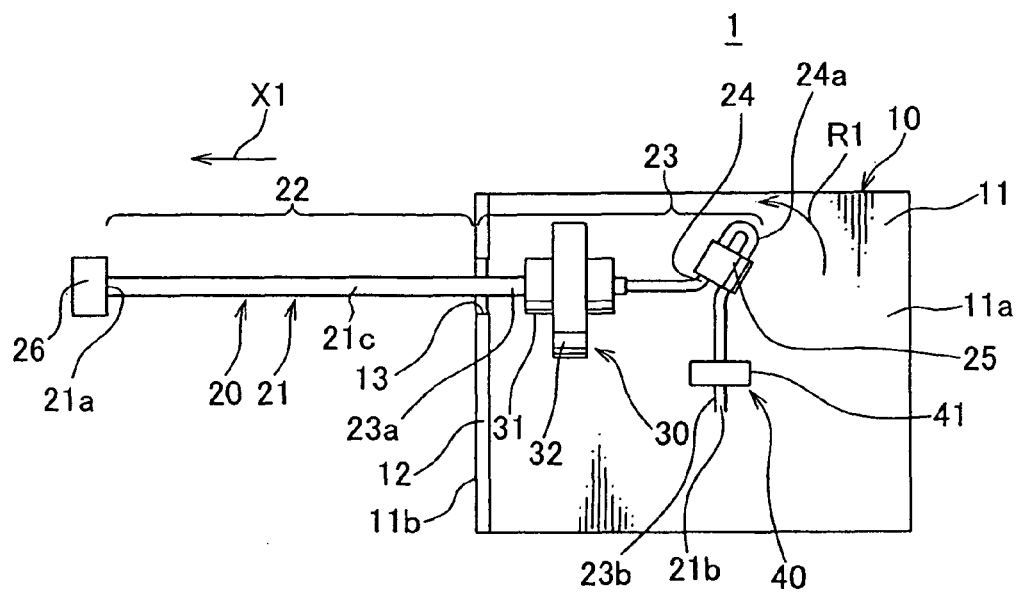
FIG. 3 is an explanatory view showing a state that a tip end part of a wiring harness is expanded.

In a condition shown in FIG. 1, when the tip end part 22 of the edge part for an external connection 21 is short, as shown in FIG. 3, the tip end part 22 is moved in an extracting direction X1 from the outer edge 11b of the interior panel 10. Then, the extra length part 24 of the base end part 23 is moved in a direction R1 to approach the first attaching member 30, and the extra length is extracted as the tip end part 22 so that the length of the tip end part 22 is increased.

Figure 4:
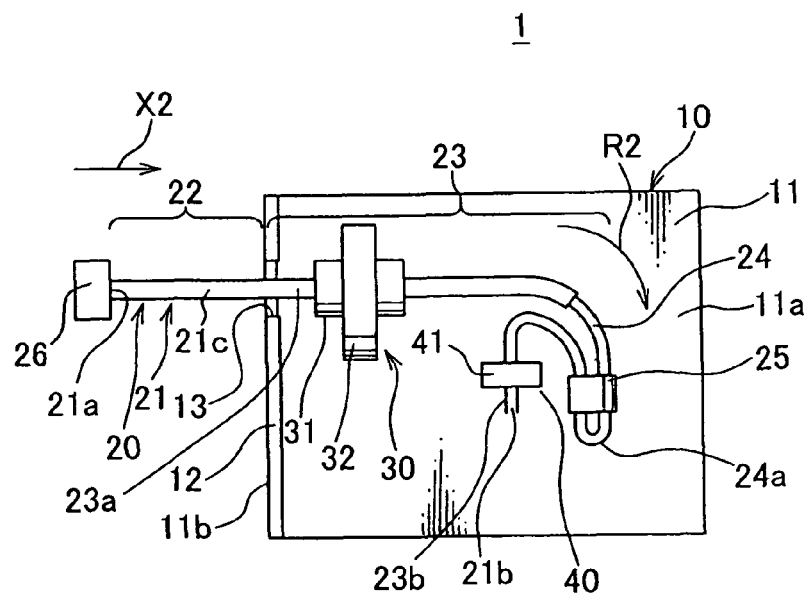
FIG. 4 is an explanatory view showing a state that the tip end part of the wiring harness is contracted.

Further, in the condition shown in FIG. 1, when the tip end part 22 of the edge part for an external connection 21 is long, as shown in FIG. 4, the tip end part 22 is moved in a pushing direction X2 to the outer edge 11b of the interior panel 10. Then, the moved length of the tip end part 22 is moved to the base end part 23 and positioned between the first attaching member 30 and the second attaching member 40, and the extra length part 24 is moved in a direction R2 to approach the second attaching member 40 so that the length of the tip end part 22 is decreased.

Further, because the tape 41 fixes the base end 21b of the edge part for an external connection 21 to the interior panel 10, a not-shown main line of the wiring harness 20 is prevented from being moved even when the tip end part 22 is expanded or contracted.

Next, an example of a method for assembling the wiring harness unit 1 to the ceiling wall inside a vehicle will be explained.

In the wiring harness unit 1, the extra length part 24 of the base end part 23 is previously pulled out as the tip end part 22 (first process). Then, the connector 26 provided at the tip end 21a of the edge part for an external connection 21 is connected to an electronic component unit provided on an upper portion of a windshield inside a vehicle (second process). Then, the interior panel 10 is attached to the ceiling wall inside the vehicle (third process). Then, the tip end part 22 is pushed toward the outer edge 11b of the interior panel 10 to adjust the length of the tip end part 22 (fourth process). Thus, the wiring harness unit 1 is assembled.

As described the above, because the length of the tip end part 22 can be adjusted in the assembling process, a reduction of workability caused by the tolerance of the wiring harness 20 is prevented, and portions aside from the edge part for an external connection 21 of the wiring harness 20 (namely, aside from the tip end part 22 and the base end part 23) are prevented from trouble.

Further, aside from this assembling method, for example, previously the interior panel 10 may be attached to the ceiling wall inside a vehicle, then, the connector 26 may be connected to the electric component unit, and the length of the tip end part 22 may be adjusted. Alternatively, previously a sufficient extra length part 24 may be provided at the base end part 23, then, the interior panel 10 may be attached to the ceiling wall inside a vehicle, and then the length of the tip end part 22 is adjusted by moving the tip end part 22 to absorb a slack while the connector 26 may be connected to the electric component unit. In these assembling methods also, similar effects are produced.

According to this embodiment, the first attaching member 30 holds the one end 23a of the base end part 23 near the tip end part 22 so as to allow the tip end part 22 to be moved in a slack absorbing direction (namely, a direction to pull out the tip end part 22 through the outer edge 11b of the interior panel 10, and a direction to push the tip end part 22 toward the outer edge 11b of the interior panel 10). Further, the second attaching member 40 fixes the other end 23b of the base end part 23 to the interior panel 10. Further, the extra length part 24 having a predetermined length is interposed between the first attaching member 30 and the second attaching member 40 of the base end part 23. Therefore, when the tip end part 22 is pulled out through the outer edge 11b of the interior panel 10, the extra length part 24 interposed between the first attaching member 30 and the second attaching member 40 is extracted as the tip end part 22. Further, when the tip end part 22 is pushed toward the outer edge 11b of the interior panel 10, the moved length is interposed between the first attaching member 30 and the second attaching member 40 as the extra length part 24. Accordingly, the length of the extra length part 24 is adjusted between the first attaching member 30 and the second attaching member 40 so that the length of the tip end part 22 is expanded and contracted.

Further, the first attaching member 30 is fixed to the upper wall 11a of the main body 11 of the interior panel 10, and includes the corrugate tube 31 which is so formed that the one end 23a of the base end part 23 is inserted into an interior of the corrugate tube 31. Therefore, when the one end 23a of the base end part 23 is inserted into the corrugate tube 31, the one end 23a of the base end part 23 is held on the interior panel 10.

Further, the binding part 24a formed by partially folding and binding the extra length part 24 is provided at the extra length part 24. Further, the first attaching member 30 and the second attaching member 40 are respectively arranged in the interior panel 10 in a manner that the axis of the one end 23a of the base end part 23 and the axis of the other end 23b of the base end part 23 are perpendicular to each other. Therefore, the extra length part 24 becomes compact because of the binding part 24a. Further, due to an arrangement of the first attaching member 30 and the second attaching member 40, when the tip end part 22 is pushed toward the outer edge 11b of the interior panel 10, the extra length part 24 is bent in a predetermined curving direction.

According to the present invention as described above, the length of the extra length part 24 is adjusted between the first attaching member 30 and the second attaching member 40 so that the length of the tip end part 22 is expanded and contracted. Therefore, the length of the tip end part 22 can be adjusted at the edge part for an external connection 21. Therefore; a reduction of workability caused by the tolerance of the wiring harness 20 is prevented, and portions aside from the edge part for an external connection 21 of the wiring harness 20 are prevented from trouble.

Further, when the one end 23a of the base end part 23 is inserted into the corrugate tube 31, the one end 23a of the base end part 23 is held on the interior panel 10. Therefore, the one end 23a of the base end part 23 is held on the interior panel 10 in a manner that the tip end part 22 of the wiring harness 20 can be moved to absorb a slack using the corrugate tube 31 which is a common and cheap member. Therefore, production cost of the wiring harness unit 1 can be reduced.

Further, the extra length part 24 is compacted and bent in a predetermined curving direction. Therefore, a space for receiving the extra length part 24 can be reduced, and easily designed.

Figure 5:
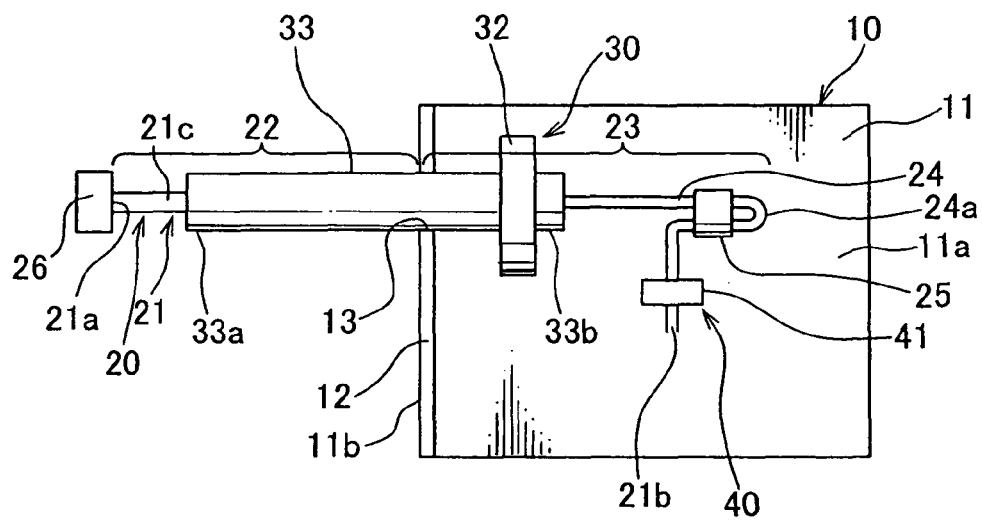
FIG. 5 is a partial top view showing another embodiment of the wiring harness unit according to the present invention.
Figure 6:
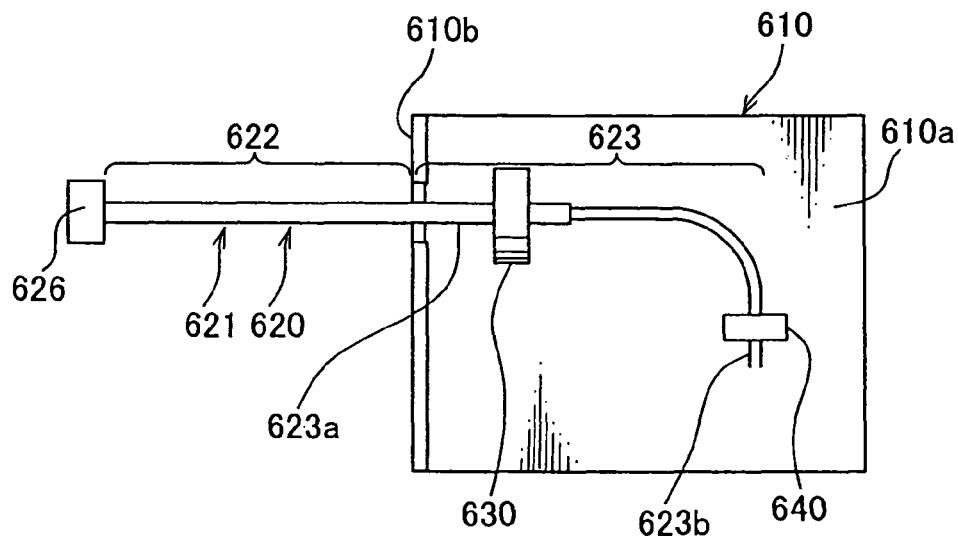
FIG. 6 is a partial top view showing a conventional wiring harness unit.
Figure 7:
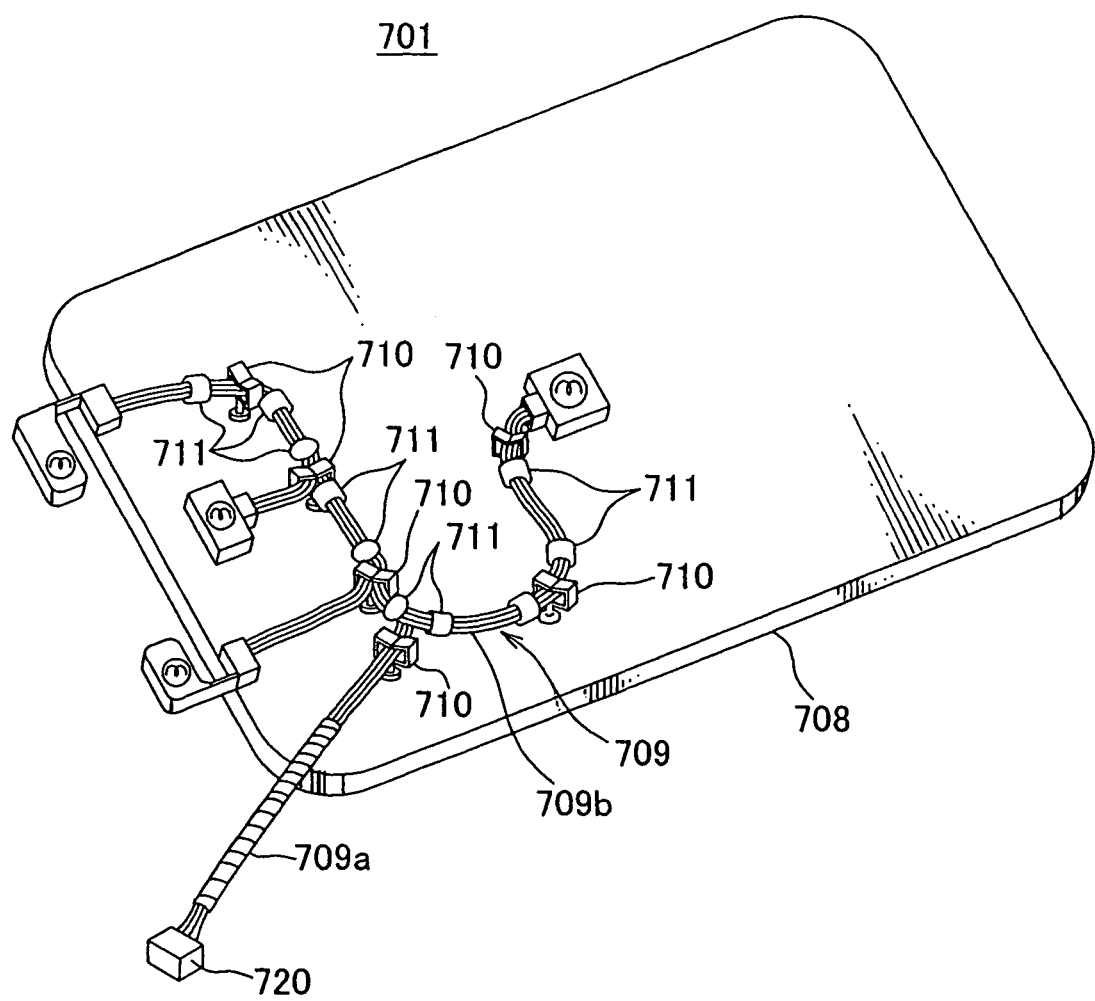
FIG. 7 is a perspective view showing another conventional wiring harness unit.

According to this embodiment, the corrugate tube 31 is received in the upper wall 11a of the main body 11. However, the present invention is not limited to this. An elongated corrugate tube partially extended from the outer edge 11b of the interior panel 10 may be used instead of the corrugate tube 31 shown in FIG. 1. A wiring harness unit 2 using such a corrugate tube is shown in FIG. 5.

The wiring harness unit 2 includes an elongated corrugate tube 33 instead of the corrugate tube 31 in the wiring harness unit 1. Incidentally, components other than the elongated corrugate tube 33 are the same as the components in the embodiment described above. Therefore, in FIG. 5, the same components are designated by the same reference numerals and their descriptions are omitted.

The elongated corrugate tube 33 is made of synthetic resin or the like, and has a circular or oval sectional tubular shape. Further, the elongated corrugate tube 33 is shorter than the edge part for an external connection 21, and is a commonly-known electric wire protector. The one end 23a of the base end part 23 and a part of or a whole of the tip end part 22 are inserted into an interior of the elongated corrugate tube 33. Namely, the one end 23a of the base end part 23 and a part of or a whole of the tip end part 22 are positioned on an inside of the elongated corrugate tube 33. Further, a one end 33a of the elongated corrugate tube 33 near the tip end part 22 is extended from the outer edge 11b of the interior panel 10 through the notch 13 formed on the wall part 12. The other end 33b of the elongated corrugate tube 33 is so arranged near the notch 13 of the main body 11 that an axis of the other end 33b is perpendicular to the wall part 12. The other end 33b is fixed to the upper wall 11a of the main body 11 with the tape 32.

The corrugate tube 33 holds the one end 23a of the base end part 23 on the upper wall 11a of the main body 11 so as to allow the tip end part 22 to be moved in a slack absorbing direction (namely, a direction for extracting the tip end part 22 from the outer edge 11b of the interior panel 10, and a direction for pushing the tip end part 22 toward the outer edge 11b of the interior panel 10). Further, the corrugate tube 31 covers a part of or a whole of the tip end part 22 extended from the outer edge 11b of the interior panel 10.

As described the above, in the wiring harness unit 2, because the corrugate tube 31 covers a part of or a whole of the tip end part 22 extended from the outer edge 11b of the interior panel 10, the tip end part 22 can be protected from an impact. Further, an inner diameter (a shorter diameter in a case of the oval shape section) of the corrugate tube 33 may be the substantially same as an outer diameter of the edge part for an external connection 21 covered by the cover member 21c. Thus, the edge part for an external connection 21 can be held more tightly.

Further, in the wiring harness unit 2, a shape of the notch 13 of the wall part 12 may follow an outer shape of the elongated corrugate tube 33. Thus, the elongated corrugate tube 33 is engaged with the notch 13, and the one end 33a is extended from the outer edge 11b of the interior panel 10. Therefore, the elongated corrugate tube 33 is supported by the wall part 12, and can be fixed to the interior panel 10 more tightly.

Further, in the embodiment described above, the first attaching member 30 includes the corrugate tube 31. However, the present invention is not limited to this. For example, the first attaching member 30 may include a holding member such as a clamp having a semi-cylinder shaped holding portion into which the one end 23a of the base end part 23 is inserted. A configuration of the first attaching member 30 is arbitrary as long as the one end 23a of the base end part 23 is held on the interior panel 10 in a manner that the tip end part 22 is movable in a slack absorbing direction.

Further, in the embodiment described above, the wiring harness unit 1 includes the interior panel 10 as a base member to be attached to a ceiling wall inside a vehicle. However, the present invention is not limited to this. A configuration of the base member is arbitrary as long as it is a plate shape and can be attached to a vehicle body such as a door inner panel or an engine room.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A wiring harness subunit arranged on a plate-shaped base member to be attached to a vehicle body comprising:
  a wiring harness having a tip end part extended through an outer edge of the base member, and a base end part continued to the tip end part and attached to the base member;
  a first attaching member fixing the wiring harness to a position on the base member and configured to hold one end of the base end part near the tip end part on the base member while still allowing the tip end part to be moved in and out to absorb a slack and extend the tip end part accordingly;
  a second attaching member configured to fix the other end opposed to the one end of the base end part to the base member;
  an extra length part having a predetermined length is provided between the first and second attaching members of the base end part; and
  a binding part formed in the extra length part by folding a portion of the extra length part in a U-shape, wherein two parts of the binding part that close to each other are fixed with tape within the extra length part.

2. The wiring harness subunit as claimed in claim 1,
  wherein the first attaching member includes a corrugate tube fixed to the base member, and into which an end of the base end part is inserted.

3. The wiring harness subunit as claimed in claim 2,
  wherein an inner diameter of the corrugate tube is substantially the same as an outer diameter of the one end of the base end part.

4. A wiring harness unit including:
  a plate-shaped base member to be attached to a vehicle body; and
  a wiring harness subunit as claimed in claim 3 arranged on the base member.

5. The wiring harness subunit as claimed in claim 2,
  wherein an end of the base end part and a part of or a whole of the tip end part are inserted into an interior of the corrugate tube, and the one end near the tip end part is extended through the outer edge of the base member.

6. A wiring harness unit including:
  a plate-shaped base member to be attached to a vehicle body; and
  a wiring harness subunit as claimed in claim 5 arranged on the base member.

7. A wiring harness unit including:
  a plate-shaped base member to be attached to a vehicle body; and
  a wiring harness subunit as claimed in claim 2 arranged on the base member.

8. The wiring harness subunit as claimed in claim 1,
  wherein the first and second attaching members are so arranged on the base member that an axis of the one end of the base end part and an axis of the other end of the base end part are not in the same direction.

9. A wiring harness unit including:
  a plate-shaped base member to be attached to a vehicle body; and
  a wiring harness subunit as claimed in claim 8 arranged on the base member.

10. A wiring harness unit including:
  a plate-shaped base member to be attached to a vehicle body; and
  a wiring harness subunit as claimed in claim 1 arranged on the base member.

* * * * *